United States Patent [19]

Kamaike et al.

[11] 4,220,222
[45] Sep. 2, 1980

[54] AUTOMATIC LANDING APPARATUS IN SERVICE INTERRUPTION

[75] Inventors: Hiroshi Kamaike; Hideo Uchino, both of Inazawa, Japan

[73] Assignee: Mitsubishi Denki Kabushiki Kaisha, Tokyo, Japan

[21] Appl. No.: 925,532

[22] Filed: Jul. 17, 1978

[30] Foreign Application Priority Data

Jul. 18, 1977 [JP] Japan .................................. 52-85814
Aug. 17, 1977 [JP] Japan .................................. 52-98353
Nov. 7, 1977 [JP] Japan .................................. 52-133191

[51] Int. Cl.² .................................................... B66B 5/02
[52] U.S. Cl. ................................................. 187/29 R
[58] Field of Search .......................................... 187/29

[56] References Cited

U.S. PATENT DOCUMENTS

| | | | |
|---|---|---|---|
| 2,701,033 | 2/1955 | Chiselbrook | 187/29 |
| 3,144,917 | 8/1964 | Tressel | 187/29 |
| 3,469,657 | 9/1969 | Sgroi | 187/29 |
| 3,658,156 | 4/1972 | Abbott | 187/29 |

Primary Examiner—J. V. Truhe
Assistant Examiner—W. E. Duncanson, Jr.
Attorney, Agent, or Firm—Oblon, Fisher, Spivak, McClelland & Maier

[57] ABSTRACT

An automatic landing apparatus in service interruption comprises; an electromagnetic brake which is released to release a main motor for driving a cage; an auxiliary motor which is equipped together with the main motor to drive the cage; an emergency power source which has a power for releasing the electromagnetic brake and driving the auxiliary motor; a brake releasing circuit which maintains the releasing of the electromagnetic brake by the emergency power source when the service interruption of the normal power source is caused during the driving of the cage; and a restarting circuit which drives the auxiliary motor when the cage is not stopped at the door openable zone when the case is moved under releasing the electromagnetic brake whereby the case is moved by the actuation of the restarting circuit.

12 Claims, 16 Drawing Figures

AUTOMATIC LANDING APPARATUS IN SERVICE INTERRUPTION

BACKGROUND OF THE INVENTION

The present invention relates to an improvement of an apparatus for automatically landing a cage of an elevator in service interruption.

In general, when the service interruption is caused during driving the cage of the elevator, the cage is stopped by braking. However, in such accident, there is a small probability to stop the cage within a door openable zone for the nearest floor and the cage stops in a midway between two floors whereby passenger is kept in the cage in the closing state.

The cage of the elevator is kept in shut down until the power source is recovered in the normal state or a non-utility generation is started and the passenger feel uneasy.

In order to prevent such trouble, it have been proposed to provide various apparatuses such as an automatic landing apparatus in service interruption which utilizes inertial energy and potential energy of the cage at the service interruption and an automatic landing apparatus in service interruption which drives the cage by a DC auxiliary motor to save the passenger.

However, in the former automatic landing apparatus in service interruption, when the service interruption is caused just after starting in the condition of substantially balanced load in which a total weight of the cage side is substantially equal to weight of a counterweight or when the service interruption is caused during driving a long midway between floors, the inertial energy of the cage at the service interruption may be not enough to reach the cage to the nearest floor and the passenger may be kept in the cage. The passenger has been kept in the cage at a probability of about 10 to 20% in the case of elevator equipped with gears depending upon efficiency of a traction machine. In this apparatus, a relief time can be short from the viewpoint of the function if reliefable since the relief can be attained with a battery having a capacity enough to release a brake and to actuate a control circuit. Accordingly, the cost of the battery can be low. However, on the contrary, it is not possible to relieve at a probability of 100% because it is operated by the inertial energy and the potential energy.

In the former automatic landing apparatus in the service interruption, a brake is usually applied within a door openable zone (the zone in which a door can be opened under interlocking a door of a cage to a door of a floor). In this case, the speed of the cage at the point of braking should be lower than a specific speed. It is impossible to stop the cage within the door openable zone under the specific load except predetermining the specific speed for stopping the cage within the door openable zone under any load.

In the worst case, the cage may be reached to a buffer at the terminal floor. This is dangerous.

On the other hand, in order to effectively utilize the inertial energy of the cage in the service interruption, higher specific speed is advantageous, however, higher specific speed causes to decrease probability of stopping the cage within the door openable zone.

That is, when the specific speed is set at lower speed, the cage may be stopped within the door openable zone without failure. However, when the service interruption is caused during driving the cage at higher speed, the inertial energy of the cage is lost at high rate, whereby the probability of stopping the cage out of the door openable zone at the nearest floor is increased when the load of the cage side is substantially equal to that of the counterweight as about balanced load. The probability of the condition that the passenger is kept in the cage is increased.

When the specific speed is set at high speed level, the inertial energy of the cage can be effectively utilized, however the probability of stopping the cage within the door openable zone is decreased.

When the probability of stopping the cage within the door openable zone is increased, the relief of the passenger in safety without failure is not perfect. On the contrary, when the relief of the passenger in safety without failure is perfect, the probability of stopping the cage out of the door openable zone is increased.

On the other hand, in the latter automatic landing apparatus in the service interruption, it is possible to relieve the passenger without failure. However, in this case, the brake is applied after the service interruption to stop the cage and the cage is driven at low speed by a DC auxiliary motor after actuating a timer relay whereby it takes a long reliefing time. The capacity of the battery should be larger than that of the former apparatus in order to drive the DC auxiliary motor.

In order to decrease a load for the battery, it is preferable to use a small size of the auxiliary motor. Accordingly, it is preferable to operate the elevator to downward weight direction that is, a heavier one of the cage or the counter weight is downwardly moved in the emergency operation. However, when the weight difference between the cage and the counterweight is too large in the operation, the auxiliary motor is rotated by a torque of the load, whereby it actuates as a generator to feed regenerative current to the battery. The regenerative current is significantly large if the weight difference is large and accordingly, the auxiliary motor and the battery should be durable to such regenerative current. It has not been attained to make compact and to reduce cost of the auxiliary motor and the battery.

SUMMARY OF THE INVENTION

It is an object of the present invention to overcome the above-mentioned disadvantages and to provide an elevator automatic landing apparatus in the service interruption which moves a cage by a small auxiliary motor driven with a battery having a small capacity to relieve the passenger without failure.

Another object of the present invention is to provide an elevator automatic landing apparatus in the service interruption, which decreases the probability of stopping the cage out of the door openable zone in safety without failure.

The other object of the present invention is to provide an elevator emergency apparatus wherein an auxiliary motor is not rotated by a torque of a load and the auxiliary motor and a battery for the motor can be compact and low cost.

Figure 1:
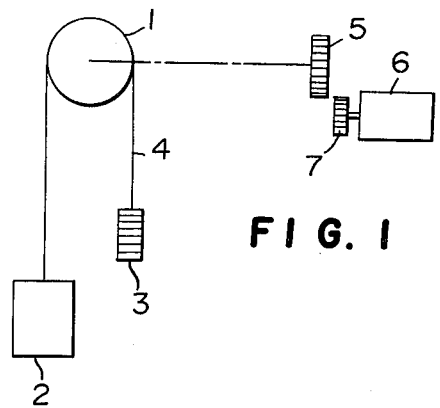
FIG. 1 is a schematic view of a first embodiment of an elevator automatic landing apparatus in the service interruption according to the present invention.
Figure 2:
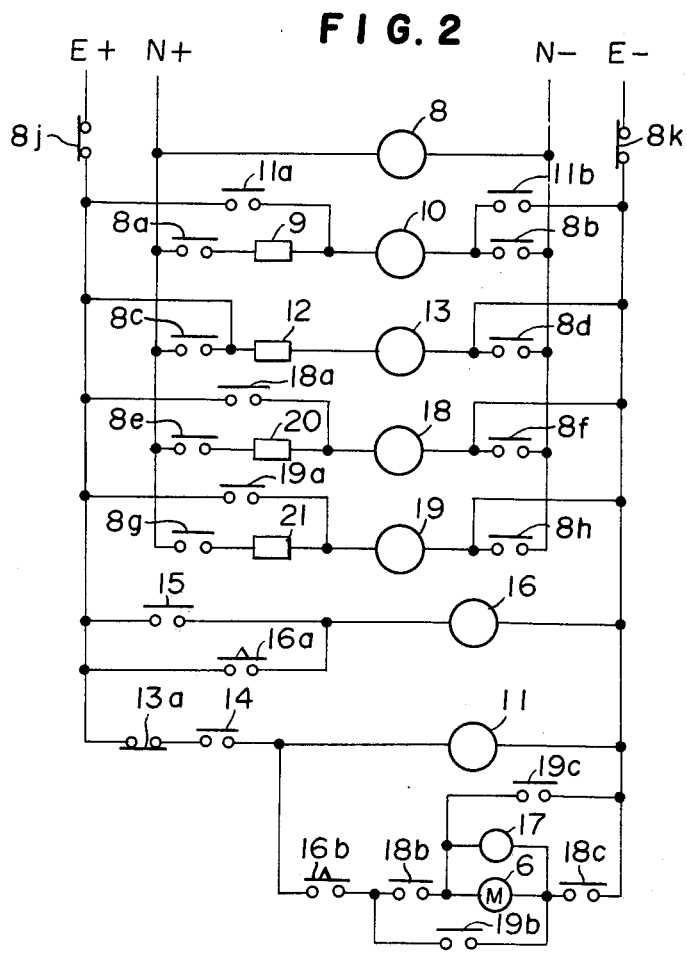
FIG. 2 is a circuit diagram of the first embodiment.
Figure 3A:
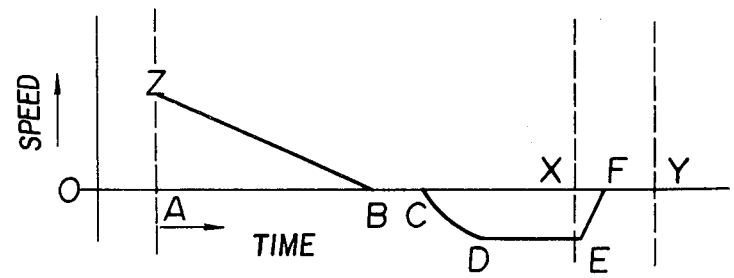
FIGS. 3a–3c are graphs of speed-time characteristic for showing a mode of relief operation.
Figure 3B:
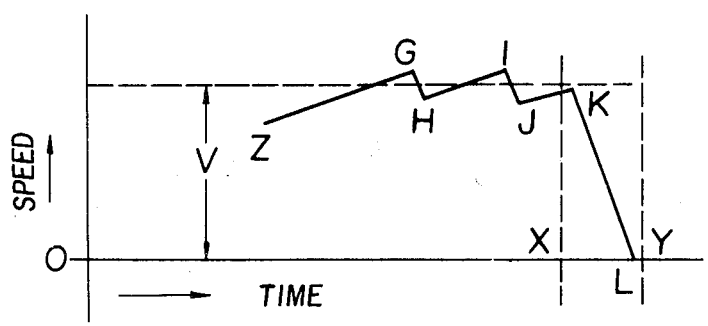

DETAILED DESCRIPTION OF THE PREFERRED EMBODIMENTS:

Referring to FIGS. 1 to 3, the first embodiment of the present invention will be illustrated.

In FIG. 1, the reference numeral (1) designates a driving sheave driven by a driving main motor (not shown); (2) designates a cage; (3) designate a counterweight; (4) designates a main rope; (5) designates a gear which is directly or indirectly connected to the sheave (1); (6) designates a small DC auxiliary motor; (7) designates a pinion which is interlocked to the gear only when the current is fed to the motor (6).

In FIG. 2, the references (N+) and (N−) designate a power source in the normal state and (E+) and (E−) designate a power source of a battery; (8) designates a service interruption detecting relay; (8a) to (8h) designate normally opening contacts; (8j) to (8k) designate normally closing contacts; (9) designates grouped contacts for releasing a brake in the normal state; (10) designates an electromagnetic brake coil which is excited to release the driving main motor and is extinguished to brake the main motor under spring force; (11) designates a relay for releasing the brake in the service interruption and (11a) and (11b) designate normally opening contacts; (12) designates a grouped mechanical contacts for detecting a door openable zone; (13) designates a relay for detecting the door openable zone; (13a) designates a normally closing contact; (14) designates a speed detecting relay contact which is closed during the time that the speed of the cage (2) is lower than a specific speed V and is opened during the time that the speed of the cage (2) is higher than the specific speed V. The specific speed V is set so as to always stop the cage within the door openable zone under any load condition by actuating electromagnetic brake when the cage (2) reached to the door openable zone.

The reference (15) designates a zero speed detecting relay contact which is closed at the zero speed of the cage (2) and (16) designates a timing mode timing relay which is turned on a specific time after actuating it and is immediately turned off by deactuating it; (16a) and (16b) designate normally opening contacts thereof; (17) designates a coil for projecting the pinion (7) of FIG. 1 for interlocking it to the gear (5); (18) designates an ascending operation relay in the normal operation; (18a) to (18c) designate normally opening contacts; (19) designates a descending operation relay; (19a) to (19c) designate normally opening contacts; (20) designates grouped contacts for ascending operation and (21) designates grouped contacts for descending operation.

FIG. 3 (a) is the graph in the case of causing the service interruption during driving under a load being substantially balanced load.

FIG. 3 (b) is a graph in the case of causing the service interruption during dowanwardly driving a heavier one of the cage or the counterweight (load falling direction) and FIG. 3 (c) is a graph in the case of causing the service interruption during upwardly driving a heavier one of the cage or the counterweight (load lifting direction).

In FIG. 3, the time is given on the abscissa and the speed of the cage is given on the ordinate.

The point Z is the point beginning the service interruption; A is the time beginning the service interruption; B is the point of natural stop after drifting; C is the point starting the auxiliary motor (6); D is the point entering into the constant speed driving under the condition that the driving torque of the auxiliary motor is equal to that of the load torque; E, K and Q are the points applying braking torque by the brake; F, L and R are the points for stopping the cage within the door openable zone; G, I and N are the points applying braking torque as the speed of the cage is over the specific speed V; H, J and P are the points releasing the braking torque and M is the point of reversing the direction and $\overline{XY}$ is the door openable zone.

The operation of the embodiment will be illustrated.

The case of causing the service interruption during the driving under the balanced load (FIG. 3 (a)) will be considered.

When the service interruption is caused at the point Z during the ascending operation, the service interruption detecting relay (8) is deactuated to open the contacts (8a) to (8h) and to close the contacts (8j), (8k). When the speed of the cage is lower than the specific speed V, the brake releasing relay (11) is actuated by the circuit (E+)-(8j)-(13a)-(14)-(11)-(8K)-(E−) to close the contacts (11a), (11b) as the speed detecting relay (14) is in the ON state. The electromagnetic brake coil (10) is excited by the circuit (E+)-(8j)-(11a)-(10)-(11b)-(8K)-(E−) whereby the brake keeps in the releasing condition. Accordingly, the cage (2) is drifted, however the speed of the cage is gradually decreased as the load is substantially balanced load. That is, the speed is varied along the curve ZB. When the area of triangle ZAB (drifting distance) is not enough to that of the distance for the nearest floor, the cage is stopped in the midway. Probability of the stop in the midway is about 20% of the service interruptions in the case of an elevator equipped with gears depending upon the position and the speed in the service interruption and the distance between floors.

When the speed of the cage is zero at the point B, the zero speed detecting relay contact (15) is closed and the contact of the timing relay (16a) is closed after the specific time (time BC) to be in self-maintenance of the timing relay (16) and the contact (16b) is also closed.

On the other hand, the ascending operation relay (18) is in self-maintenance by the circuit (E+)-(8j)-(18a)-(18)-(8K)-(E−) whereby the contacts (18b), (18c) are closed. Accordingly, the auxiliary motor (6) is started by the circuit (E+)-(8j)-(13a)-(14)-(16b)-(18b)-(6)-(18c)-(8K)-(E−). The direction of the rotation is selected to downwardly move the cage (2). At the same time, the coil (17) for projecting the pinion is excited to interlock the pinion (7) to the gear (5) and the generated torque of the auxiliary motor (6) is transmitted to initiate the driving from the point C. The cage is driven at a constant speed from the point D that the generated torque of the auxiliary motor (6) is equal to the load torque. When the cage (2) is put into the door openable zone $\overline{XY}$ of the nearest floor, the grouped contacts (12) are closed and the door openable zone detecting relay (13) is turned on by the circuit (E+)-(8j)-(12)-(13)-(8K)-(E−) whereby the contact (13a) is opened. Accordingly, the generated torque of the auxiliary motor (6) decreased to be zero and the pinion (7) is returned and the relay (11) is turned off and the electromagnetic brake coil (10) is extinguished to apply the braking torque at the point E whereby the cage (2) is decelerated to stop at the point F. The speed of the cage is shown by the curve ZBCDEF.

The case of causing the service interruption during moving to the load falling direction (FIG. 3 (b)) will be considered.

When the service interruption is caused at the point Z, the brake maintains in the releasing state to drift the cage as the case of causing the service interruption during the driving under a load being substantially balanced load, the cage is accelerated by the unbalanced load. When the speed of the cage is over the specific speed V, the contact (14) is opened to turn off the relay (11) and accordingly the electromagnetic brake coil (10) is extinguished and the cage is decelerated under applying the brake at the point G.

When the speed of the cage become to be lower than the specific velocity V, the contact (14) is closed to turn on the relay (11) and the contacts (11a), (11b) are closed and the electromagnetic brake coil (10) are excited to release the brake and the cage is accelerated at the point H and the operation is repeated as I. J.

When the cage is put in the door openable zone $\overline{XY}$, the relay (13) is turned on and the electromagnetic brake coil (10) is extinguished to apply the brake and the cage is stopped at the point L within the door openable zone $\overline{XY}$. The speed of the cage is shown by the curve ZGHIJKL.

Figure 3C:
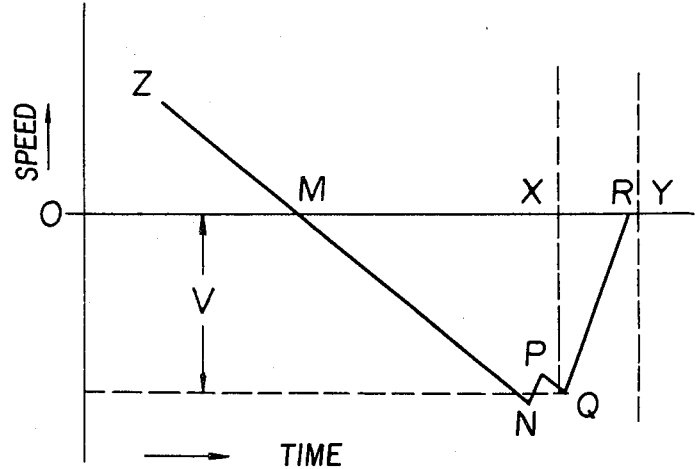

The case of causing the service interruption during moving to the load lifting direction (FIG. 3(c)) will be considered.

When the service interruption is caused at the point Z, the brake is maintained in the releasing state to drift the cage as the case of causing the service interruption during the driving under a load being substantially balanced load. However, the cage is suddenly decelerated by the unbalanced load to be zero speed at the point M and then to be accelerated in reverse drifting direction. The timing relay (16) is not actuated. When the speed of the cage is increased to be higher than the specific speed V, the brake is applied at the point N as the case of the load falling direction, and the speed of the cage is varied along the curve NPQ.

When the cage is put in the door openable zone $\overline{XY}$, the relay (13) is turned on and the contact (13a) is opened whereby the relay (11) is turned off and the electromagnetic brake coil (10) is extinguished to apply the brake and the cage is stopped at the point R in the door openable zone $\overline{XY}$. The speed of the cage is shown by the curve ZMNPQR.

The passenger in the cage (2) is relieved to the nearest floor by the above-mentioned operation.

Thus, when the cage (2) can be moved by an inertial energy in the driving or an unbalanced energy between the cage weight and the couterweight (3), the energy can be utilized to attain speedy relief.

When the energy is not enough to relieve the passenger, the cage (2) is moved by the auxiliary motor whereby the relief can be attained without failure. Accordingly, the auxiliary motor (6) is used only when the condition of the cage (2) is in the condition of substantially balanced load without the energy whereby the required torque is small and the auxiliary motor can be a small size. The cage (2) is moved by the auxiliary motor (6) to the reverse direction to the prior driving direction, because the required torque for the auxiliary motor (6) should be further decreased. That is, there is higher probability to stop the cage in midway in the case of the load lifting direction. If the cage is moved to the reverse direction, the driving to the load falling direction is given whereby the cage (2) can be moved by a small torque.

In about 80% of the relief operation, the cage (2) is moved by the inertial energy in the driving or the unbalance energy between the cage weight and the counterweight (3), whereby the battery as the power source of the auxiliary motor (6) can have only a small capacity.

Figure 4:
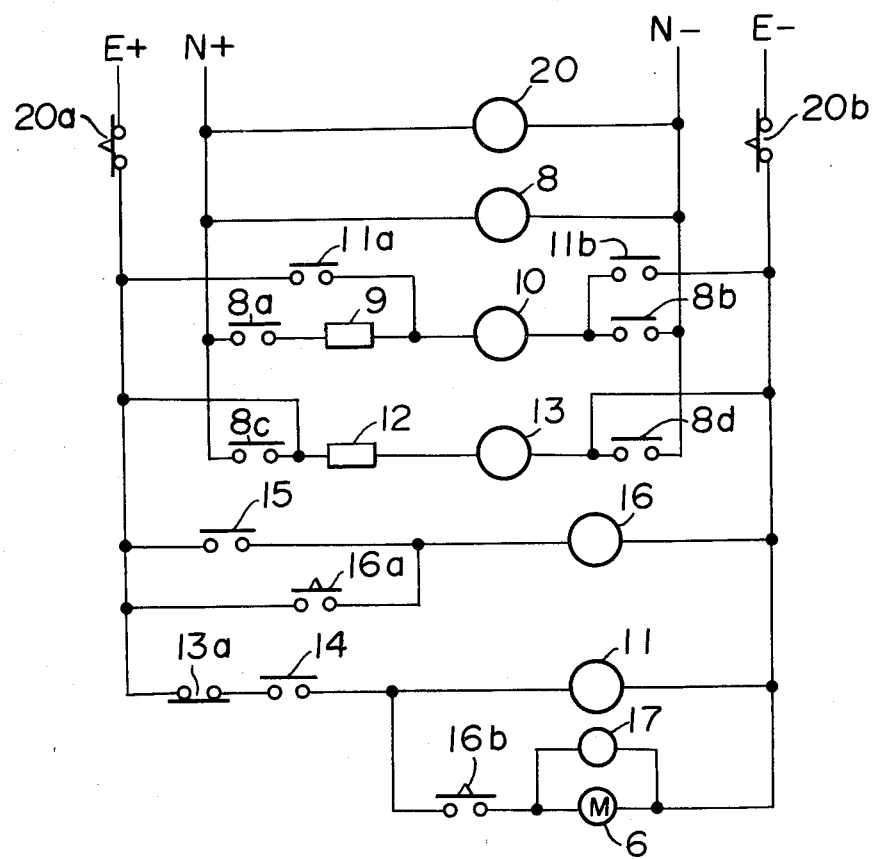
FIG. 4 is a circuit diagram of a second embodiment of the present invention.

FIG. 4 shows the second embodiment of the present invention.

In the drawing, the reference numeral (20) designates a timing mode timing relay which is immediately actuated and is returned after a specific time by deactuating it; and (20a) and (20b)designate normally closing contacts.

The timing relay (20) is actuated in the normal condition, the contacts (20a), (20b) are opened. When the service interruption is caused during the driving the cage (2), the brake coil (10) is extinguished to stop the cage (2). When the specific time is passed after the service interruption, the timing relay (20) is returned to close the contacts (20a), (20b) and the power is applied from the battery power source (E+), (E−). If the cage (2) is out of the door openable zone $\overline{XY}$ of the nearest floor, and the speed of the cage is lower than the specific speed V, the contacts (13a), (14) are closed whereby the brake releasing relay (11) is actuated to close the contacts (11a), (11b) and the electromagnetic brake is released. Thus, if the cage (2) is stopped because of the balance load condition and the specific time is passed, the timing relay (16) is actuated by closing the contact (15) to attain the self-maintenance and the contact (16b) is closed whereby the cage (2) is driven by the auxiliary motor (6).

The driving direction of the cage (2) may be set to downward direction.

When the cage (2) is upwardly or downwardly moved under the unbalanced load by releasing the electromagnetc brake, the timing relay (16) is not actuated as described referring to FIG. 3 (c), and the contact (16b) is not closed and the auxiliary motor (6) is not driven. The following operation is as described above and the cage (2) is stopped within the door openable zone $\overline{XY}$ of the nearest floor.

In the embodiment, the auxiliary motor (6) is driven only when the cage (2) is not moved, whereby the auxiliary motor (6) can be a small size.

As described above, in accordance with the first and second embodiments, the cage is moved by the auxiliary motor to the nearest floor with the emergency power source when the cage is stopped after the drifting of the cage under maintaining the releasing of the electromagnetic brake or the cage is not moved by releasing the electromagnetic brake with the emergency power source in the service interruption. Accordingly, the required torque is small and the auxiliary motor can be a small size and the capacity of the emergency power source can be small.

Referring to FIG. 5 to 8, the third embodiment of the present invention will be illustrated.

The third embodiment is characterized by effectively utilizing the inertial energy of the cage and accordingly, the description of the auxiliary motor is omitted.

Figure 5:
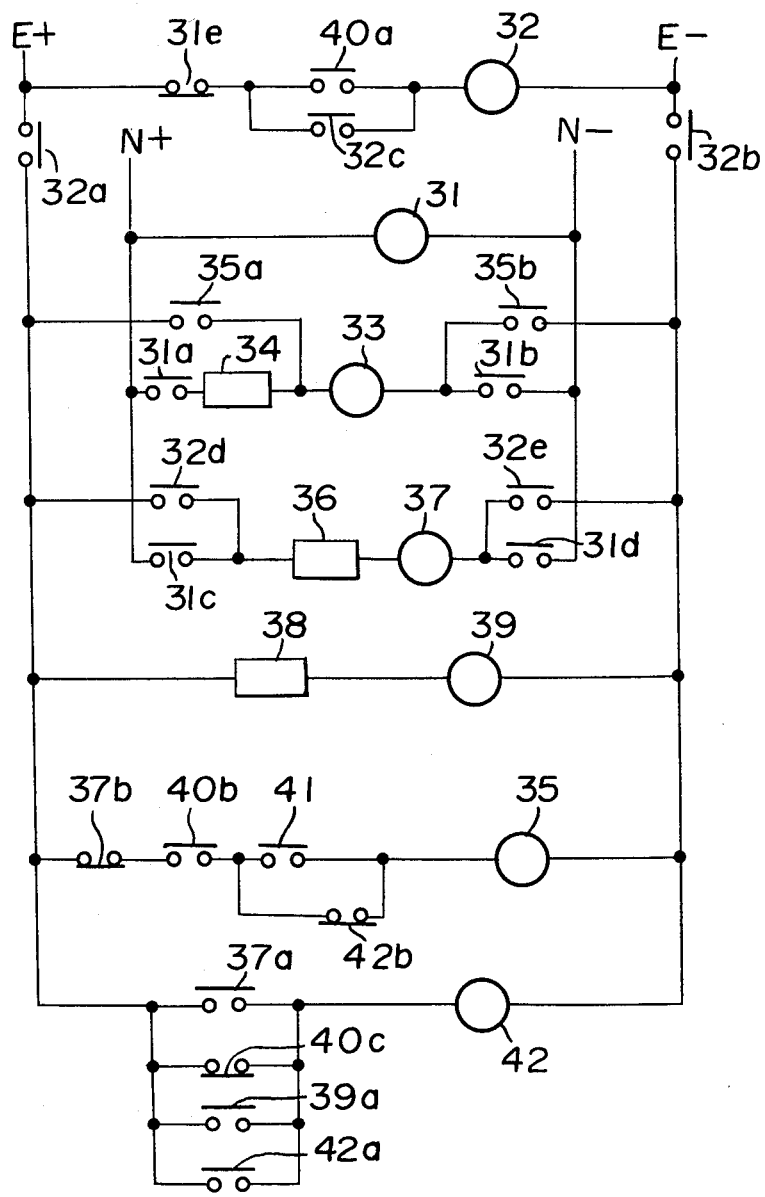
FIG. 5 is a schematic view of a third embodiment of an elevator automatic landing apparatus in the service interruption according to the present invention.

In FIG. 5, the references (N+) and (N−) designate a normal power source; (E+) and (E−) designate an emergency power source; (31) designates a service interruption detecting relay; (31a) to (31d) designate its normally opening contacts; (31e) designates a normally closing contact; (32) designates a relief operation starting command relay; (32a) to (32e) designate its normally opening contacts; (33) designates an electromagnetic brake coil which is excited to release the main motor for driving and is extinguished to brake the motor by a spring; (34) designates a grouped contacts for maintaining brake releasing condition uder the normal power source; (35) designates a brake releasing relay in the service interruption; (35a) and (35b) designate normally opening contacts; (36) designates grouped mechanical contacts for detecting the door openable zone; (37) designates a relay for detecting the door openable zone; (37a) designates a normally opening contact; (37b) designates a normally closed contact; (38) designates grouped mechanical contacts for detecting the specific zone from the specific position above the terminal floor to the terminal floor; (39) designates a relay for detecting the terminal specific zone; (39a) designates a normally opening contact; (40a) and (40b) designate a first speed detecting relay contact which opens over the first specific speed $V_1$; (40c) designates a contact which closes over the first specific speed $V_1$; (41) designates a second speed detecting relay contact which opens over the second specific speed $V_2$; (42) designates a relay for memorizing the fact of higher than the first specific speed $V_1$ or an entrance of the cage floor in the door openable zone or in the specific zone above the terminal floor; (42a) designates its normally opening contact and (42b) designates its normally closing contact.

Figure 6:
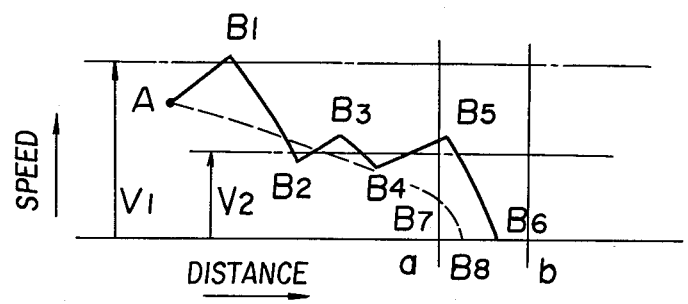
FIGS. 6 to 8 are diagrams for illustrating operations of a cage of FIG. 5.
Figure 7:
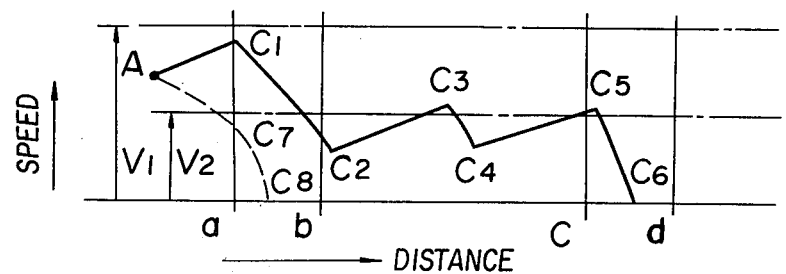
Figure 8:
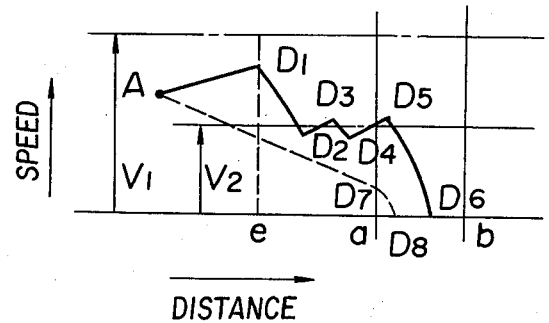

FIGS. 6 to 8 show the speed of the cage when the service interruption is caused during the driving of the cage and the speed of the cage is shown in abscissa and the distance is shown in the ordinate.

The automatic relief device in the service interruption is actuated at the point being relatively departed from the door openable zone in a middle floor (FIG. 6); at the point near the door openable zone in a middle floor (FIG. 7) and at the point being relatively departed from the specific zone above the terminal floor (FIG. 8).

The full line shows the speed of the cage during the driving the heavier one of the cage or the counter weight to the descending direction (load falling direction) and the broken line shows the speed of the cage during the driving of the cage in substantially balanced load.

In FIGS. 6 to 8, the first specific speed $V_1$ is set higher than the second specific speed $V_2$ for a desired value; the second specific speed $V_2$ is set so as to stop the cage in the door openable zone under any load when the brake is actuated at the time entering into the door openable zone; A designates the point starting the automatic relief operation in the service interruption; $B_1$, $B_3$, $B_5$, $B_7$, $C_1$, $C_3$, $C_5$, $C_7$, $D_1$, $D_3$, $D_5$ and $D_7$ designate respectively brake actuating points; $B_2$, $B_4$, $C_2$, $C_4$, $D_2$ and $D_4$ designate respectively brake releasing points; $B_6$, $B_8$, $C_6$, $C_8$, $D_6$ and $D_8$ designate respectively stopping points; $\overline{ab}$ and $\overline{cd}$ respectively designate the door openable zone; and $\overline{eb}$ designates the specific zone above the terminal floor.

The operation of the embodiment especially the typical operating mode will be illustrated.

When the service interruption is caused during the driving of the cage, the service interruption detecting relay (31) is deactuated to open the contacts (31a) to (31d) and to close the contact (31e).

When the speed of the cage is lower than the first specific speed $V_1$, the first speed detecting relay contacts (40a), (40b) are closed and the contact (40c) is opened to actuate the relief operation starting command relay (32) by the circuit (E+)-(31e)-(40a)-(32)-(E−) to close the contacts (32a) to (32e). Accordingly, the relay (32) is self-maintained and the brake releasing relay (35) is actuated by the circuit (E+)-(32a)-(37b)-(40b)-(42b)-(35)-(32b)-(E−) to close the contacts (35a), (35b). Accordingly, the brake coil (33) is excited by the circuit (E+)-(32a)-(35a)-(33)-(35b)-(32b)-(E−) whereby the brake maintains the releasing condition to start the relief operation in the service interruption.

When the relief operation in the service interruption is started at the point being relatively departed from the door openable zone $\overline{ab}$ of the nearest floor as shown in FIG. 6, the cage is accelerated in the case of driving to the load falling direction because of the unbalanced load. When the speed of the cage reaches to the first specific speed $V_1$ at the point $B_1$, the contacts (40a), (40b) are opened and the contact (40c) is closed. Accordingly, the memory relay (42) is actuated by the circuit (E+)-(32a)-(40c)-(42)-(32b)-(E−) and the relay (42) is self-maintained by closing the contact (42a). The contacts (40b), (42b) are opened whereby the relay (35) is deactuated to open the contacts (35a), (35b), (the contact (41) of the second speed detecting relay is opened) whereby the brake coil (33) is extinguished to actuae the brake.

When the speed of the cage is decreased to be lower than the second specific speed $V_2$, the contact (41) is closed at the point ($B_2$). At this time, the contact (40b) is in the closing state. Accordingly, the relay (35) is actuated by the circuit (E+)-(32a)-(37b)-(40b)-(41)-(35)-(32b)-(E−) to close the contacts (35a), (35b). The brake coil (33) is excited again to release the brake. The cage is accelerated by the unbalanced torque under releasing the brake. When the speed of the cage becomes higher than the second specific speed $V_2$, the contact (41) is opened at the point $B_3$, and the relay (35) is deactuated and the brake coil (33) is extinguished to actuate the brake and the speed of the cage is decreased again. This operation is repeated. When the cage reaches to the point $B_5$ of the door openable zone $\overline{ab}$, the grouped contacts (36) are closed and the door openable zone detecting relay (37) is actuated by the circuit (E+)-(32a)-(32d)-(36)-(37)-(32e)-(32b)-(E−) to open the contact (37b) and the deactuate the relay (35). Accordingly, the brake coil (33) is extinguished to actuate the brake and the cage is stopped within the door openable zone $\overline{ab}$.

When the cage is driven under substantially balanced load, the cage is drifted by releasing the brake at the point A. However, an unbalanced torque required for accelerating the cage is not given to slowly descend the cage, however, the cage can drive for relatively long distance by the drifting.

When the cage reached to the point $B_7$ of the door openable zone $\overline{ab}$, the cage is stopped by actuating the brake.

When the service interruption is caused during the driving of the cage to the direction lifting the heavier one of the cage or the counterweight (load lifting direction), the brake is released at the point A as described above. Thus, the speed of the cage is suddenly decreased by the unbalanced torque to stop the cage and the cage is driven to the reverse direction. After the reversing, the cage is driven to the load falling direction. This operation is described above and the description of the operation is omitted.

The operation of starting the relief operation at relatively near the door openable zone $\overline{ab}$ as shown in FIG. 7 will be illustrated.

In this operation, the brake is released at the point A to drift the cage. When the speed of the cage at the time reaching to the $C_1$ point of the door openable zone $\overline{ab}$ is significantly higher than the second specific speed $V_2$, (for example, the load falling direction), the brake is actuated at the point $C_1$, however the cage can not stop within the door openable zone $\overline{ab}$. Thus, the grouped contacts (36) are closed at the time reaching the cage to the point $C_1$. Accordingly, the relay (37) is actuated to close the contact (37a) and the relay (42) is actuated to attain the self-maintenance by the circuit (E+)-(32a)-(37a)-(42)-(32b)-(E−).

When the cage leaves the door openable zone $\overline{ab}$, the grouped contacts (36) are opened and the relay (37) is deactuated to close the contact (37b). When the speed of the cage is lower than the second specific speed $V_2$, the contacts (40b), (41) are closed at the point $C_2$ and the relay (35) is actuated to excite the brake coil (33) whereby the brake is released to drift the cage.

In the case of the driving of the cage to the load falling direction, when the cage is accelerated to be higher than the second specific speed $V_2$, the contact (41) is opened to deactuate the relay (35) whereby the brake is actuated.

As described referring to FIG. 6, the braking and releasing of the brake is repeated depending upon the speed of the cage being higher or lower than the second specific speed $V_2$ to stop the cage at the door openable zone $\overline{cd}$ of the next floor.

The operation of substantially balanced load, is clearly understood from the drawing and accordingly the description is omitted.

The operation for landing to the terminal floor as shown in FIG. 8 will be illustrated.

As described above, the brake is released at the point A, and the cage is drifted and is accelerated in the case of the load falling operation. However, when the cage reaches to the specific zone $\overline{eb}$ above the terminal floor the grouped contacts (38) are closed at the point $D_1$, the relay (39) is actuated by the circuit (E+)-(32a)-(38)-(30)-(32b)-(E−) and the contact (39a) is closed and the relay (42) is actuated to attain the self-maintenance. Accordingly, the contact (42b) is opened and the brake is continuously actuated until the speed of the cage reaches to be lower than the second specific speed $V_2$ to close the contact (41) because the relay (35) is not actuated.

When the speed of the cage reaches to be lower than the second specific speed $V_2$, the brake is released as described above.

The cage is drifted under repeating the braking and the releasing of the brake until reaching to the door openable zone of the terminal floor. When the cage reaches to the door openable zone $\overline{ab}$, the brake is actuated to stop the cage.

When the cage is driven under substantially balanced load, the cage is not accelerated. The cage is drifted to the point $D_7$ in the case of the speed shown by the broken line in FIG. 8, and the cage is stopped by actuating the brake at the time reaching to the door openable zone $\overline{ab}$.

The first and second specific speeds $V_1$ and $V_2$ can be selected as desired. When the first specific speed $V_1$ is set to be higher than the rated speed of the normal operation, it is possible to utilize all of the inertial energy of the cage in the service interruption.

As described above, in accordance with the third embodiment, when the electromagnetic brake is released to drift the cage by the emergency power source in the service interruption and the cage is accelerated to reach the first specific speed, the motor is braked by the electromagnetic brake to decelerate the cage. When the speed of the cage reaches to lower than the second specific speed which is set to be lower than the first specific speed, the electromagnetic brake is released again to drift the cage. When the speed of the cage reaches to the second specific speed, the electromagnetic brake is actuated again to maintain the speed of the cage to be lower than the specific second speed.

When the unbalanced load is small, it can be attained to increase the probability to reach the cage to the nearest floor under utilizing the inertial energy of the cage.

On the other hand, when the unbalanced load is large, the speed of the cage is controlled whereby, the cage can be stopped to the nearest floor without failure.

When the cage accelerated by the drifting, reaches to the door openable zone of the nearest floor, the speed of the cage is controlled so as not to be higher than the second specific speed. Accordingly, even though the cage cannot be stopped within the door openable zone of the nearest floor, the cage can be stopped within the door openable zone of the next floor without failure.

When the cage accelerated by the drifting reaches to the specific position above the terminal floor, the speed of the cage is controlled to be lower than the second specific speed whereby the cage can be safely stopped to the terminal floor without failure.

Referring to FIGS. 9 to 13, the fourth embodiment of the present invention will be illustrated.

In the embodiment, the description on the inertial energy is omitted because the auxiliary motor is characteristic.

Figure 9:
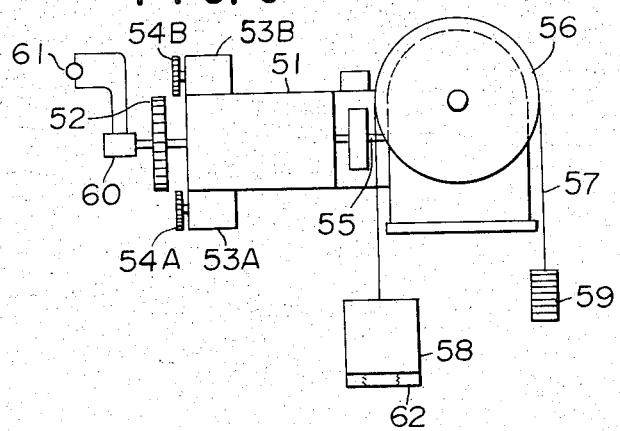
FIG. 9 is a schematic view of a fourth embodiment of an elevator emergency apparatus according to the present invention.

In FIG. 9, the reference numeral (51) designates a main motor for driving a cage; (52) designates a large gear mounted on a shaft of the main motor (51); (53A) designates an auxiliary motor for ascent; (53B) designates an auxiliary motor for descent; (54A) and (54B) designate small gears mounted on the auxiliary motors (53A), (53B) respectively; and the small gears respectively connected to worm gears (55) (not shown); (57) designates a main rope wound on a sheave (56); (58) designates a counterweight; (60) designates a tachometer dynamo; (61) designates an overspeed detecting relay which is actuated at the time rising the voltage of the tachometer dynamo (60) higher than the specific value; (62) designates a load detector for detecting the load in the cage (58).

In FIGS. 10 to 13, the reference numeral (63) designates a shaft of the auxiliary motor (53B); (64) designates a movable element which is formed to be non-rotatable around the shaft (63) and has a flange (64a) projected outwardly; (65B) designates a one way transmission such as the conventional one way clutch; (65a) designates an outer wheel of the transmission (65B) and the outer wheel is mounted on the small gear (54B) and interlocked to the movable element (64) so as to move the movable element on the shaft (63) to the axial direction; (65b) designates a cam surface formed on the inner peripheral part of the outer wheel (65a); (65c) designates a metallic spring; (65d) designates a roller; (66) designates a holder for pivoting the shaft (63) and the holder is mounted on the auxiliary motor (53B); (67) designates an annular stopper fitted on the shaft (63); (68) designates a connecting rod which is pivoted by a fulcrum (68a) on the holder (66) and the lower end of the connecting rod is fitted to the movable element (64); (69) designates a plunger whose one end is connected to the upper end of the connecting rod (68) to be movable to the axial direction of the shaft (63); (70) designates a spring for pushing the plunger (69) to the arrow line direction A; and (71B) designates a coil for the plunger which is mounted on the auxiliary motor (53B) to provide force shifting the plunger (69) to the arrow line direction (B) against the force of the spring (70).

The structure of the auxiliary motor (53A) is similar to that of the auxiliary motor (53B) except the reference (65A) designates the one way transmission and (71A) designate the plunger coil.

The operation of the one way transmission (65B) will be briefly illustrated.

Figure 12A:
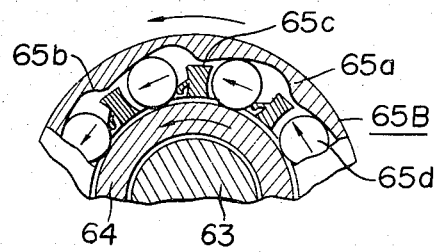
FIGS. 12a and b are vertically sectional views taken along the line XII—XII of FIG. 11.
Figure 12B:
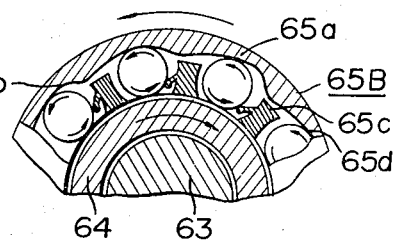

When the movable element (64) is turned to the counterclockwise direction (the descent direction) in the case of FIG. 12 (a), the roller (65d) is moved to the position for interlocking to the cam surface (65b) by the metallic spring (65c) and the outer wheel (65a) is driven by wedging action between the cam surface (65b) and the movable element (64). Then, when the outer wheel (65a) is turned to the counterclockwise direction at the speed of faster than that of the movable element (64) in the case of FIG. 12 (b); the movable element (64) relatively turned to the clockwise direction to the outer wheel (65a) whereby the roller (65d) is departed from the cam surface (65b) and the outer wheel (65a) is freely turned without contacting with the movable element (64).

Figure 10:
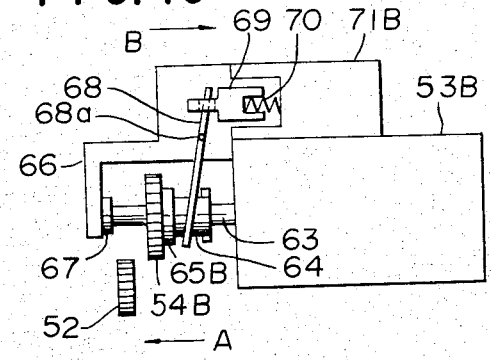
FIG. 10 is a front view of an auxiliary motor of FIG. 9.
Figure 11:
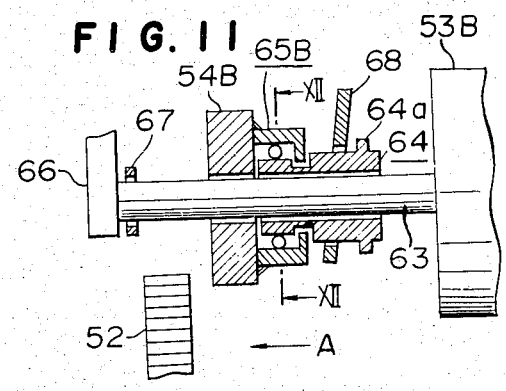
FIG. 11 is a vertically sectional view of a transmission device of FIG. 10.

When the plunger coil (71B) is excited in the condition of FIG. 10, the plunger (69) is attracted to the arrow line direction B whereby the connecting rod (68) is turned to the clockwise direction, and the lower edge of the connecting rod (68) pushes the side surface of the one way transmission (65B) and the transmission (65B), the small gear (54B) and the movable element (64) are shifted to the arrow line direction A. When the small gear (54B) is contacted with the annular stopper (57), the small gear (54B) is interlocked to the large gear (52).

When the shaft (63) is turned to the counterclockwise direction in the case of FIG. 12(a), after the interlocking, the torque is transmitted through the movable element (64), the transmission (65B) and the small gear (54B) to the large gear (52) to drive the large gear.

Then, when the plunger coil (71B) is extinguished in the condition of interlocking the small gear (54B) to the large gear (52), the plunger (69) is shifted to the arrow line direction A by the spring (70) to turn the connecting rod (68) to the counterclockwise direction. Accordingly, the lower edge of the connecting rod (68) pushes the flange (64a) and the movable element (64), the transmission (65B) and the small gear (54B) are shifted to the arrow line direction B to return them to the condition of FIG. 11.

Figure 13:
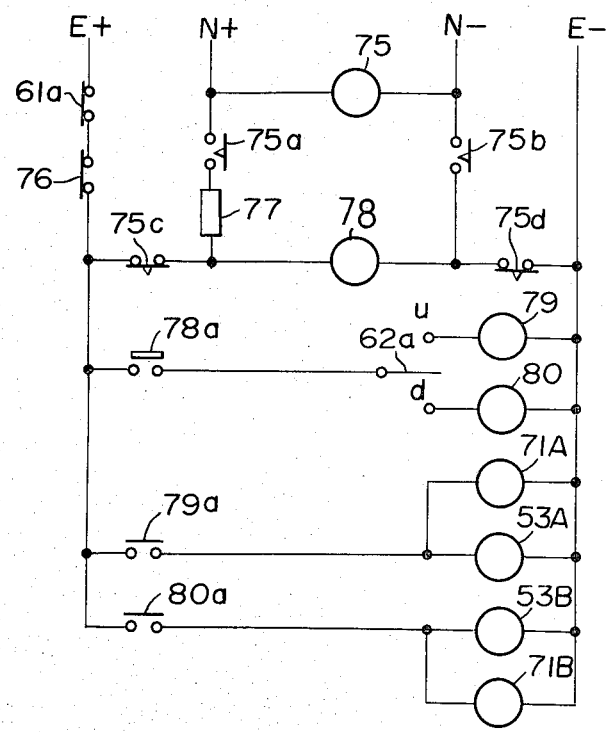
FIG. 13 is a control circuit diagram.

In FIG. 13, the references (N+) and (N−) designate normal DC power source; (E+) and (E−) designate battery power source; (61a) designates a normally closing contact of the overspeed detecting relay (61) of FIG. 9; (62a) designates a contact of the load detector (62) which is connected to the d side in the case of the load that the weight of the cage (58) is heavier than that of the counterweight (59) connected to the u side in the reverse case.

The reference numeral (75) designates a service interruption detecting timing relay which is immediately operated by actuating it and is returned after a predetermined time by deactuating it; (75a) and (75b) designate its normally opening contacts; (75c) and (75d) designate its normally closing contacts; (76) designates a door openable zone detecting relay contact which is opened at the time reaching the cage (58) to the door openable zone; (77) designates grouped contacts for the brake releasing condition which are closed when the condition for releasing the brake is given in the operation with the normal power source; (78) designates a brake coil which is excited to release the braking of the main motor (51) and which is extinguished to brake the main motor by the spring (not shown); (78a) designates a brake contact which is closed by exciting the brake coil (78) and is opened by extinguishing the brake coil; (79) designates a relay for ascending; (79a) designates its normally opening contact; (80) designates a relay for descending and (80a) designates its normally opening contact.

The operation of the embodiment will be illustrated.

During the normal state of the normal power source (N+), (N−), the service interruption detecting timing relay (75) are actuated to close the contacts (75a), (75b) and to open the contact (75c), (75d).

The circuit is not shown, however, the normal operation of the cages is performed by the circuit.

When the service interruption of the normal power source (N+), (N−) is caused, the brake coil (78) is extinguished to brake the main motor (51) and the cage (58) is stopped. On the other hand, the service interruption detecting timing relay (75) is deactuated and it is returned at the time of stopping the cage (58) to open the contacts (75a), (75b) and to close (75c), (75d).

The door openable zone detecting relay contact (76) is closed during the time that the cage (58) is out of the door openable zone, whereby the brake coil (78) is excited by the circuit (E+)-(11a)-(76)-(75c)-(78)-(75d)-(E−) and the brake of the main motor (51) is released and the brake contact (78a) is closed.

When the load of the cage (58) is large and the weight of the cage (58) is heavier than that of the counterweight (59), the contact (62a) of the load detector contact is connected to the d side and the relay for descending (80) is actuated to close the contact (80a). Accordingly, the auxiliary motor for descending (53B) and the plunger coil (71B) are excited. As described above, the small gear (64B) is interlocked to the large gear (52) by exciting the plunger coil (71B).

In this case, if the difference between the weights of the cage (58) and the counterweight (59) is not enough large, the cage (58) can not drive by itself. However, the torque of the auxiliary motor (53B) is transmitted through the transmission (65B) to the large gear (52) whereby the motor (51) is driven (without current feeding) and the cage (58) descends through the sheave (56). When the cage (58) reaches to the door openable zone of the nearest floor, the contact (76) is opened and the auxiliary motor (53B) and the plunger coil (71B) are extinguished. The main motor (51) is braked to stop the cage (58) and the door is opened to relieve the passenger.

When the difference between the weights of the cage (58) and the counterweight (59) is large and the revolutionary speed of the small gear (54B) i.e. the revolutionary speed of the outer wheel (65a) of the transmission (65B) is higher than the revolutionary speed of the auxiliary motor (53B), in the case of interlocking of the small gear (54B) to the large gear (52), the outer wheel (65a) is freely rotated without contacting with the movable element (64) i.e. the shaft (63) of the auxiliary motor (53B). Thus, the auxiliary motor (53B) is not turned by the cage (58) and the overspeed of the auxiliary motor can be prevented.

The cage (58) descends by itself. When the speed of the cage (58) is over the specific value, the overspeed detecting relay (61) is actuated to open the contact (61a) whereby the brake coil (78) of the auxiliary motor (53B) are extinguished and the cage (58) is decelerated. When the speed of the cage (58) reaches to lower than the specific value, the overspeed detecting relay (61) is deactuated again to close the contact (61a) whereby the brake coil (78) is excited and the cage (58) descends by itself.

The operation after reaching the cage (58) to the door openable zone of the nearest floor is the same with the above-mentioned operation.

In every cases, when the door openable zone detecting relay contact (76) is opened, the plunger coil (71B) is extinguished. The small gear (54B) is moved to the arrow line direction B by the operation of the connecting rod (68) and the interlocking of the small gear (54B) to the large gear (52) is released.

The operation of the auxiliary motor for descending (53B) has been described and it is the same with that of the auxiliary motor for ascending (53A) except when the shaft (63) of the auxiliary motor (53A) is turned to the ascending direction of the cage (58), the torque is transmitted to the large gear (52) by the transmission (65A).

In said embodiment, the large gear (52) is mounted on the shaft of the main motor (51). Even though the large gear (52) is mounted on worm gears (55), the operation is substantially the same.

In said embodiment, the relief operation in the service interruption has been described. The operation can be also applied for the relief of the passenger from the cage in an accident, by replaying the service interruption detecting timing relay (75) to a relay for detecting accident.

In said embodiment, the auxiliary motor for ascending (53A) and the auxiliary motor for descending (53B) are used. It is possible to replace them to one auxiliary motor. In this case, the direction of the cage (58) is limited to one direction. It is preferable to be the descent direction because of the following reason.

In general, the counterweight (59) is balanced to the weight of the cage (58) with 45% of load to the rated load in a rope type elevator.

On the other hand, when the load condition of the auxiliary motor is considered, the worst condition is the overload (110% to the rated load) in the ascending operation or it is the non-load in the descending operation.

The difference between the weights of the cage (58) and the counterweight (59) is smaller in the descending operation than in the ascending operation from the viewpoint of the weight of the counterweight (59).

The total weight of the driving system of the elevator, i.e. total weight of the cage (58), the counterweight (59), the main rope (57) and the movable cable (not shown), is smaller in the non-load operation than in the overload operation.

Thus, in every cases, the torque of the auxiliary motor can be smaller in the non-load descending operation than in the overload ascending operation and the capacity of the auxiliary motor required for the descending operation can be smaller.

Moreover, when only one auxiliary motor is used, the load detector (62) and the relays for deciding the direction are not needed and the cost can be reduced.

As described above, in accordance with the fourth embodiment, the elevator emergency apparatus comprises the auxiliary motor which is driven by the battery to move the cage in the service interruption or the accident and the transmission disposed between the auxiliary motor and the cage, whereby the torque of the auxiliary motor is transmitted to the cage whereas the torque of the cage is not transmitted to the auxiliary motor and the feeding of regenerative current to the battery which caused by the function of the auxiliary motor rotated by the load as the generator, can be prevented and the auxiliary motor and the battery can be small sizes in low costs.

What is claimed is:

1. An automatic landing apparatus in service interruption which comprises:
    an electromagnetic brake which is released to release a main motor for driving a cage;
    an auxiliary motor which is equipped together with the main motor to drive the cage;
    an emergency power source which has a power for releasing the electromagnetic brake and driving the auxiliary motor;
    a brake releasing circuit which maintains the releasing of the electromagnetic brake by the emergency power source when the service interruption of the normal power source is caused during the driving of the cage; and
    a restarting circuit which drives the auxiliary motor only when the cage stops outside the door openable zone after the cage moved on condition that the electromagnetic brake is released by the emergency power source.

2. An automatic landing apparatus in service interruption according to claim 1 wherein the direction of driving the cage by the auxiliary motor is reverse to the direction of driving the cage before the service interruption.

3. An automatic landing apparatus in service interruption according to claim 1 or 2 which further comprises a memory circuit for memorizing the fact that the cage is accelerated in the service interruption to reach a first specific speed; and a control circuit which decelerates the cage by braking the main motor by the electromagnetic brake under actuating the memory circuit and moves the cage under releasing the electromagnetic brake when the speed of the cage reaches to lower than a second specific speed set to be lower than the first specific speed and decelerates the cage again by braking the main motor by the electromagnetic brake when the speed of the cage reaches to higher than the second specific speed whereby the speed of the cage is controlled by the control circuit to be lower than the second specific speed.

4. An automatic landing apparatus in service interruption according to claim 3, which further comprises an emergency operating device comprising a one way transmission which is disposed between the auxiliary motor and the cage and transmits the torque of the auxiliary motor to the cage but does not transmit the torque of the cage to the auxiliary motor.

5. An automatic landing apparatus in service interruption according to claim 1 or 2 which further comprises a memory circuit for memorizing the fact that the cage reaches to a specific position; a control circuit which decelerates the cage by braking the main motor by the electromagnetic brake under actuating the memory circuit and moves the cage under releasing the electromagnetic brake when the speed of the cage reaches to lower than a specific speed and decelerates the cage again by braking the main motor by the electromagnetic brake when the speed of the cage reaches to higher than the specific speed whereby the speed of the cage is controlled by the control circuit to be lower than the specific speed.

6. An automatic landing apparatus in service interruption according to claim 5 wherein the memory circuit memorizes the fact that the drifted cage reaches to the door openable zone.

7. An automatic landing apparatus in service interruption according to claim 5 wherein the memory circuit memorizes the fact the drifted cage reaches to a specific position above the terminal floor.

8. An automatic landing apparatus in service interruption according to claim 5, which further comprises an emergency operating device comprising a one way transmission which is disposed between the auxiliary motor and the cage and transmits the torque of the auxiliary motor to the cage but does not transmit the torque of the cage to the auxiliary motor.

9. An automatic landing apparatus in service interruption according to claim 1 which further comprises an emergency operating device comprising an one way transmission which is disposed between the auxiliary motor and the cage and transmits the torque of the auxiliary motor to the cage but does not transmit the torque of the cage to the auxiliary motor.

10. An automatic landing apparatus in service interruption according to claim 1, which further comprises an emergency operating device comprising a one way transmission which is disposed between the auxiliary motor and the cage and transmits the torque of the auxiliary motor to the cage but does not transmit the torque of the cage to the auxiliary motor.

11. An automatic landing apparatus in service interruption which comprises:
an electromagnetic brake which is released to release a main motor for driving a cage;
an auxiliary motor which is equipped together with the main motor to drive the cage;
an emergency power source which has a power for releasing the electromagnetic brake and driving the auxiliary motor;
a brake releasing circuit which maintains the releasing of the electromagnetic brake by the emergency power source when the service interruption of the normal power source is caused during the driving of the cage;
a restarting circuit which drives the auxiliary motor when the cage is not stopped at the door openable zone when the cage is moved under releasing the electromagnetic brake whereby the cage is moved by the actuation of the restarting circuit;
a memory circuit for memorizing the fact that the cage is accelerated in the service interruption to reach a first specific speed; and
a control circuit which decelerates the cage by braking the main motor by the electromagnetic brake under actuating the memory circuit and moves the cage under releasing the electromagnetic brake when the speed of the cage reaches to lower than a second specific speed set to be lower than the first specific speed and decelerates the cage again by braking the main motor by the electromagnetic brake when the speed of the cage reaches to higher than the second specific speed whereby the speed of the cage is controlled by the control circuit to be lower than the second specific speed.

12. An automatic landing apparatus in service interruption which comprises:
an electromagnetic brake which is released to release a main motor for driving a cage;
an auxiliary motor which is equipped together with the main motor to drive the cage;
an emergency power source which has a power for releasing the electromagnetic brake and driving the auxiliary motor;
a brake releasing circuit which maintains the releasing of the electromagnetic brake by the emergency power source when the service interruption of the normal power source is caused during the driving of the cage;
a restarting circuit which drives the auxiliary motor when the cage is not stopped at the door openable zone when the cage is moved under releasing the electromagnetic brake whereby the cage is moved by the actuation of the restarting circuit;
a memory circuit for memorizing the fact that the cage reaches to a specific position; and,
a control circuit which decelerates the cage by braking the main motor by the electromagnetic brake under actuating the memory circuit and moves the cage under releasing the electromagnetic brake when the speed of the cage reaches to lower than a specific speed and decelerates the cage again by braking the main motor by the electromagnetic brake when the speed of the cage reaches to higher than the specific speed whereby the speed of the cage is controlled by the control circuit to be lower than the specific speed.

* * * * *